US012794087B2

(12) United States Patent
Urano et al.

(10) Patent No.: US 12,794,087 B2
(45) Date of Patent: Nov. 10, 2026

(54) BATTERY MODULE

(71) Applicant: Vehicle Energy Japan Inc., Hitachinaka (JP)

(72) Inventors: Kazuaki Urano, Hitachinaka (JP); Hiroaki Masuda, Hitachinaka (JP); Tatsuhiko Kawasaki, Hitachinaka (JP); Osamu Kubota, Hitachinaka (JP)

(73) Assignee: Vehicle Energy Japan Inc., Hitachinaka (JP)

( * ) Notice: Subject to any disclaimer, the term of this patent is extended or adjusted under 35 U.S.C. 154(b) by 292 days.

(21) Appl. No.: 18/660,664

(22) Filed: May 10, 2024

(65) Prior Publication Data

US 2024/0291116 A1 Aug. 29, 2024

Related U.S. Application Data

(63) Continuation of application No. 17/287,029, filed as application No. PCT/JP2019/040849 on Oct. 17, 2019, now Pat. No. 12,021,266.

(30) Foreign Application Priority Data

Oct. 31, 2018 (JP) ................................ 2018-205189

(51) Int. Cl.
*H01M 50/522* (2021.01)
*H01M 50/209* (2021.01)
(Continued)

(52) U.S. Cl.
CPC ....... *H01M 50/522* (2021.01); *H01M 50/209* (2021.01); *H01M 50/50* (2021.01);
(Continued)

(58) Field of Classification Search
CPC .. H01M 50/522; H01M 50/209; H01M 50/50; H01M 50/503; H01M 50/55;
(Continued)

(56) References Cited

U.S. PATENT DOCUMENTS

| | | | |
|---|---|---|---|
| 5,256,502 | A | 10/1993 | Kump |
| 2010/0247996 | A1 | 9/2010 | Ijaz et al. |

(Continued)

FOREIGN PATENT DOCUMENTS

| | | | |
|---|---|---|---|
| CN | 203932177 | * | 11/2014 |
| CN | 203932177 | U | 11/2014 |

(Continued)

OTHER PUBLICATIONS

International Search Report (PCT/ISA/210) issued in PCT Application No. PCT/JP2019/040849 dated Jan. 7, 2020 with English translation (four (4) pages).

(Continued)

*Primary Examiner* — Matthew W Van Oudenaren
(74) *Attorney, Agent, or Firm* — Crowell & Moring LLP

(57) ABSTRACT

Provided is a battery module capable of keeping a joint strength high at a joint between dissimilar metals of a busbar. The battery module 100 includes a plurality of battery cells each having cell terminals 1*p* and 1*n*, and a busbar 2A joining the terminals of the battery cells 1. The busbar 2A has a plurality of connection face portions 2*c*1 and 2*c*2 each connected to a corresponding one of the terminals 1*p* and 1*n* of the battery cells 1; a plurality of rising portions each rising from a corresponding one of the plurality of connection face portions 2*c*1 and 2*c*2; and a connection portion connecting the plurality of rising portions. The busbar includes a copper portion 2*e* including copper and an aluminum portion 2*f* including aluminum, and a joint between the copper portion 2*e* and the aluminum portion 2*f* are located on the connection face portion 2*c*1, 2*c*2.

6 Claims, 18 Drawing Sheets

(51) Int. Cl.

| | |
|---|---|
| ***H01M 50/50*** | (2021.01) |
| ***H01M 50/503*** | (2021.01) |
| ***H01M 50/55*** | (2021.01) |
| ***H01M 50/553*** | (2021.01) |
| ***H01M 50/566*** | (2021.01) |
| ***H01M 50/569*** | (2021.01) |

(52) U.S. Cl.
CPC ......... *H01M 50/503* (2021.01); *H01M 50/55* (2021.01); *H01M 50/553* (2021.01); *H01M 50/566* (2021.01); *H01M 50/569* (2021.01); *H01M 2220/20* (2013.01)

(58) Field of Classification Search
CPC ............. H01M 50/553; H01M 50/566; H01M 50/569; H01M 50/204; H01M 50/516; H01M 50/507; H01M 50/521; H01M 50/526; H01M 2220/20
See application file for complete search history.

(56) References Cited

U.S. PATENT DOCUMENTS

| | | | |
|---|---|---|---|
| 2012/0100761 | A1 | 4/2012 | Grosse et al. |
| 2013/0306353 | A1 | 11/2013 | Zhao |
| 2019/0119801 | A1 | 4/2019 | Oda |
| 2020/0321589 | A1 | 10/2020 | Watahiki et al. |
| 2022/0149487 | A1 | 5/2022 | Tanaka et al. |

FOREIGN PATENT DOCUMENTS

| | | | |
|---|---|---|---|
| EP | 2 339 663 | A1 | 6/2011 |
| JP | 2012-138239 | A | 7/2012 |
| JP | 2012-515418 | A | 7/2012 |
| JP | 2015-517728 | A | 6/2015 |
| JP | 2016-58215 | A | 4/2016 |
| JP | 2016-115458 | A | 6/2016 |
| JP | 2016-115601 | A | 6/2016 |
| WO | WO 2012/118014 | A1 | 9/2012 |
| WO | WO 2014/178114 | A1 | 11/2014 |
| WO | WO 2018/155090 | A1 | 8/2018 |
| WO | WO 2018/173586 | A1 | 9/2018 |
| WO | WO 2019/069837 | A1 | 4/2019 |
| WO | WO 2020/183817 | A1 | 9/2020 |

OTHER PUBLICATIONS

Japanese-language Written Opinion (PCT/ISA/237) issued in PCT Application No. PCT/JP2019/040849 dated Jan. 7, 2020 (six (6) pages).
Japanese-language Office Action issued in Japanese Application No. 2020-553771 dated Feb. 22, 2022 (two (2) pages).
Extended European Search Report issued in European Application No. 19879488.5 dated Aug. 23, 2022 (nine (9) pages).
Chinese-language Office Action issued in Chinese Application No. 201980067711.1 dated Feb. 28, 2023 (eight (8) pages).
Chinese-language Office Action issued in Chinese Application No. 201980067711.1 dated Jul. 6, 2023 (5 pages).

* cited by examiner

BATTERY MODULE

CROSS REFERENCE TO RELATED APPLICATIONS

This application is a Continuation of U.S. patent application Ser. No. 17/287,029, filed Apr. 20, 2021, which is a 371 of International Application No. PCT/JP2019/040849, filed Oct. 17, 2019, which claims priority to Japanese Patent Application No. 2018-205189, filed Oct. 31, 2018, the disclosures of all of which are expressly incorporated by reference herein.

TECHNICAL FIELD

The present invention relates to battery modules each having a plurality of battery cells.

BACKGROUND ART

A plurality of battery cells making up a battery module are joined to each other at their terminals via a connecting conductor called a busbar. The background art relating to this busbar includes a technique disclosed in Patent Literature 1. Patent Literature 1 describes a busbar including a copper part (701) that is laser welded to a negative electrode group and is made of a copper material, and an aluminum part (702) that is laser welded to a cell positive electrode group and is made of aluminum. This busbar is configured to linearly weld (705) these two parts made of two types of metals by an ultrasonic roller seam welding process (see paragraphs 0064, 0067 and FIG. 15).

CITATION LIST

Patent Literature

Patent Literature 1: JP 2012-515418 A

SUMMARY OF INVENTION

Technical Problem

A busbar joining the terminals of a plurality of batteries receives stress caused by vibrations applied to the battery module or a bulging of the battery cells during charging/discharging. A busbar including dissimilar metals joined as in Patent Literature 1 therefore has to be configured to keep a joint strength high so that the joint between the dissimilar metals does not peel off when stress acts on the joint between the dissimilar metals.

Solution to Problem

One of the major aims of the present application is to keep a joint strength high at the joint between dissimilar metals of a busbar.

One of typical aspects of the present invention to solve the above problems relates to a battery module including: a plurality of battery cells each having terminals; and busbars each joining the terminals of the battery cells. Each busbar has: a plurality of connection face portions each connected to a corresponding one of the terminals to be joined; a plurality of rising portions each rising from a corresponding one of the plurality of connection face portions; and a connection portion connecting the plurality of rising portions. The busbar includes a copper portion containing copper and an aluminum portion containing aluminum. A joint between the copper portion and the aluminum portion is located on the connection face portion connected to the battery terminal. The connection face portion having the joint between the copper portion and the aluminum portion is connected to the battery cell terminal that is a strong member. This increases the rigidity at the joint between the copper portion and the aluminum portion and so increases the natural frequency, thus reducing stress acting on the joint between the copper portion and the aluminum portion. This configuration therefore keeps a joint strength high at the joint between the copper portion and the aluminum portion.

According to another aspect of the present invention to solve the above problems, a battery module includes a joint between the copper portion and the aluminum portion that is located on the rising portions rising from the connection face portions, and the copper portion and the aluminum portion are partially bent in a hook shape and are joined to each other at inner faces. In this way, a partial face of the copper portion and a partial face of the aluminum portion that define the rising portion are bent in a hook shape and are joined to each other at their inner faces, and this configuration allows the joint to receive a reactive force in the direction opposite to the stress acting on the joint between the copper portion and the aluminum portion. As a result, the stress acting on the joint between the copper portion and the aluminum portion is reduced. This configuration therefore keeps a joint strength high at the joint between the copper portion and the aluminum portion.

Advantageous Effects of Invention

Major aspects of the present invention keep a joint strength high at the joint between dissimilar metals of the copper portion and the aluminum portion. This therefore enhances the resistance of the battery module against vibrations, and so provides a reliable battery module having excellent resistance.

Further features of the present invention will be clear from the following descriptions and the attached drawings. Other problems, configurations and advantageous effects also will be clear from the following descriptions of the embodiments.

DESCRIPTION OF EMBODIMENTS

Figure 1:
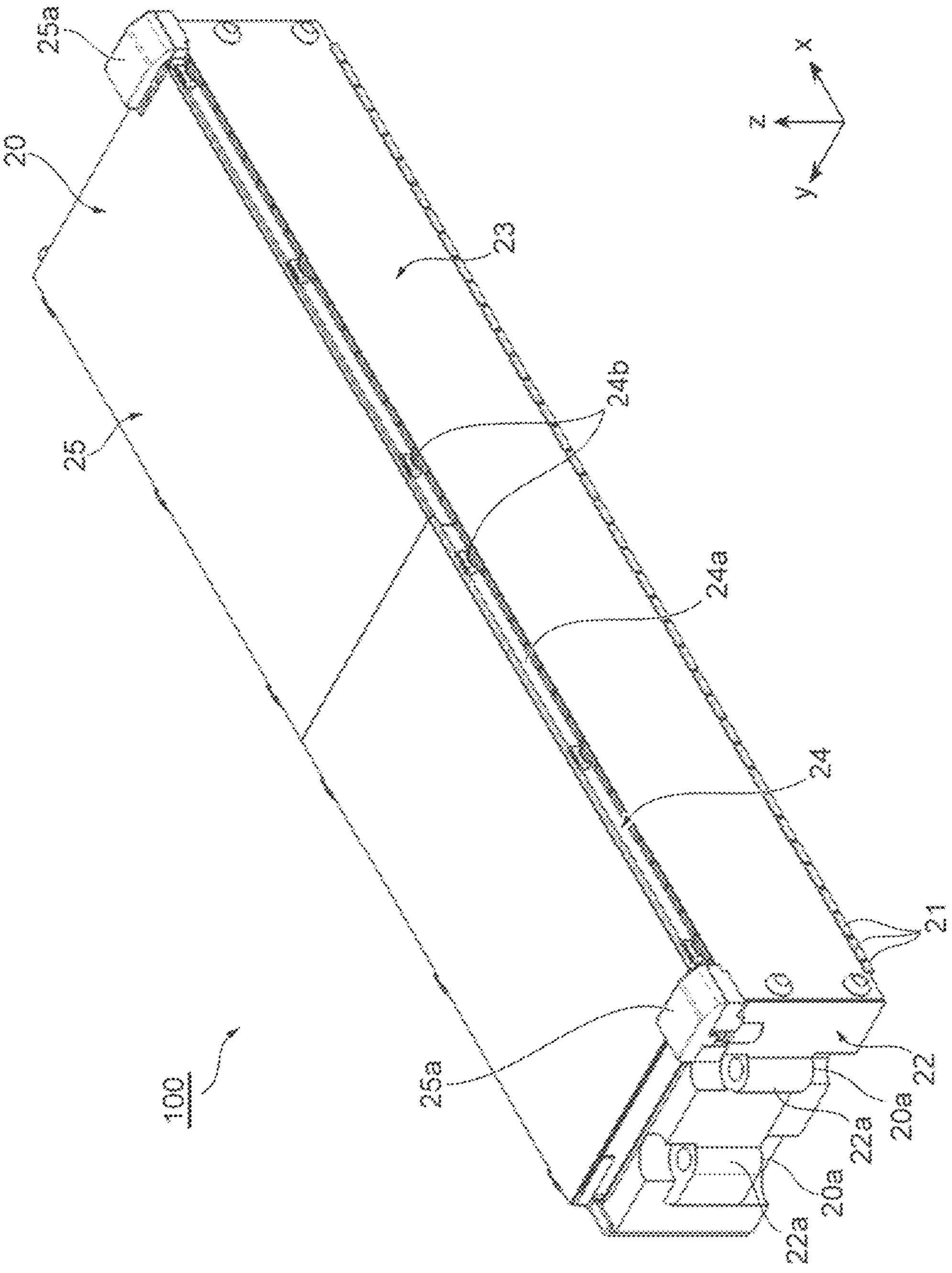
FIG. 1 is a perspective view showing the appearance of a battery module according to Embodiment 1 of the present invention.

The following describes some embodiments of the present invention, with reference to the attached drawings.

The following may describe various parts of the battery module while referring to the orthogonal coordinate system having x axis, y axis, and z axis as shown in the drawings or the directional terms, such as upper, lower, left, right, front, and rear. These axes and directions are used for convenience in describing the illustrated state of the battery module, and do not limit the posture or arrangement of the battery module.

Embodiment 1

FIGS. 1 to 9 show Embodiment 1 of the present invention.

Figure 2:
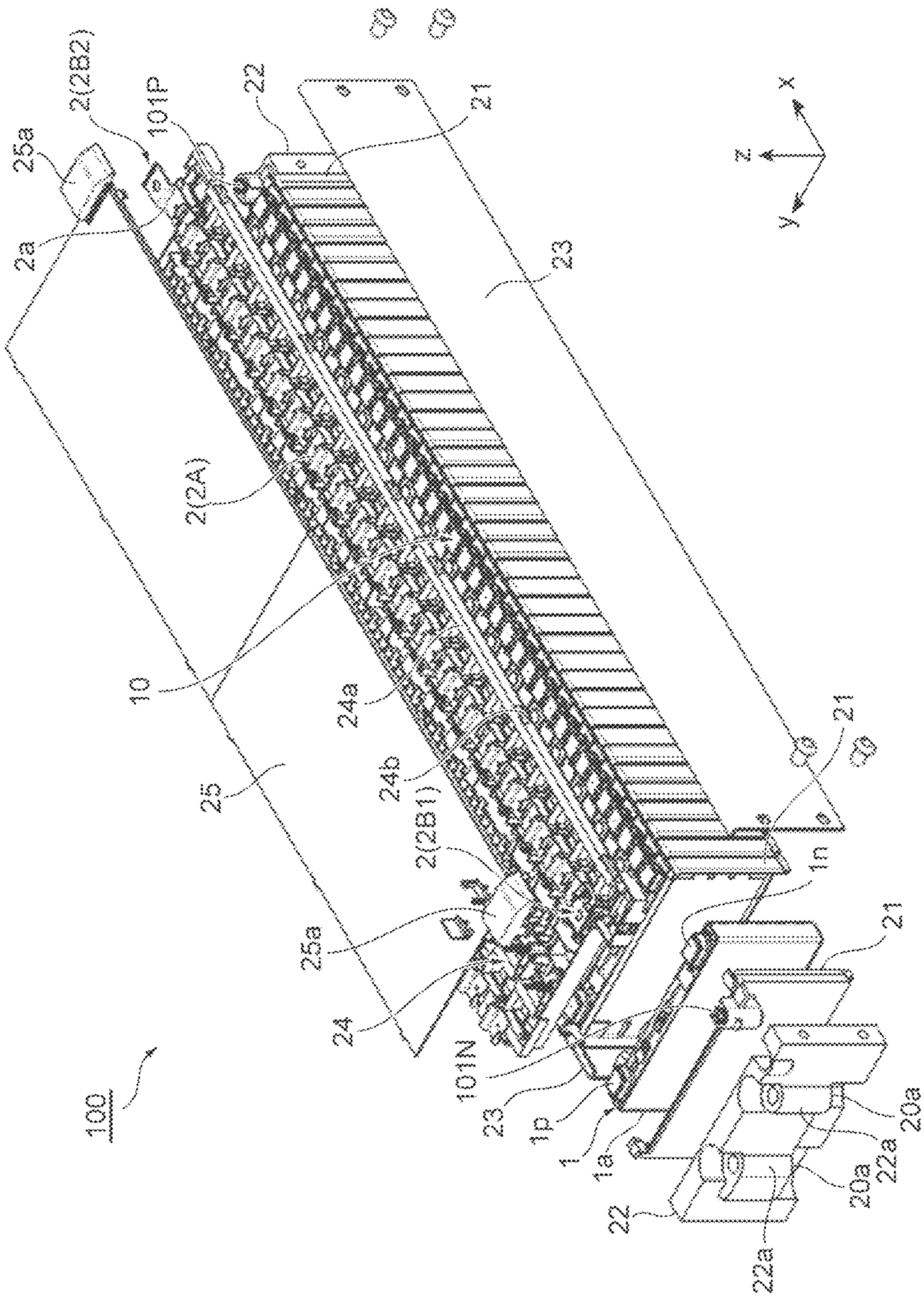
FIG. 2 is an exploded perspective view of the battery module in FIG. 1.

First, the configuration of a battery module 100 will be described referring to FIGS. 1 and 2. FIG. 1 is a perspective view showing the appearance of the battery module 100, and FIG. 2 is an exploded perspective view of the battery module 100.

The battery module 100 mainly includes: module terminals 101P and 101N that are external terminals; a battery cell group 10 including a plurality of battery cells 1; and busbars 2 electrically and mechanically connecting the plurality of battery cells 1 of this battery cell group 10 and electrically and mechanically connecting this battery cell group 10 with the module terminals 101P and 101N. The detailed configuration will be described later, and the most distinctive feature of this embodiment is the busbars 2 that electrically and mechanically connect the plurality of battery cells 1. The battery module 100 includes a housing 20 and an electronic circuit board not shown in addition to the components described above.

The battery cell group 10 is configured so that flattened rectangular battery cells 1, i.e., thin hexahedral or cuboid battery cells 1 having the thickness smaller than the width and the height, are stacked in the thickness direction (x-axis direction). Each battery cell 1 is a rectangular lithium-ion secondary battery, and includes a flattened rectangular cell case 1*a*, an electrode group and electrolyte not shown that are stored in this cell case 1*a*, and a pair of cell terminals 1*p* and 1*n* connecting to the electrode group and disposed on the vertically upper end face of the cell case 1*a*. Note here that the cell terminal 1*p* is a positive electrode terminal and the cell terminal 1*n* is a negative electrode terminal.

The cell terminals 1*p* and 1*n* of the battery cell 1 each have a substantially cuboid and three-dimensional shape that protrudes vertically from the upper end face of the cell case 1*a*. A resin insulating member is disposed between the cell terminal 1*p*. In and the cell case 1*a* or between the cell case 1*a* and the electrode group for electrical insulation. The plurality of battery cells 1 making up the battery cell group 10 are stacked while alternately reversing their direction by 180° so that the positive cell terminal 1*p* of one of mutually adjacent battery cells 1 and the negative cell terminal 1*n* of the other battery cell 1 are adjacent to each other in the stacking direction (x-axis direction).

The housing 20 has a substantially cuboid shape, having the dimension in the length direction (x-axis direction) that is larger than the dimensions in the width direction (y-axis direction) and in the height direction (z-axis direction), and holds the plurality of battery cells 1 making up the battery cell group 10. Specifically the housing 20 has a plurality of cell holders 21, a pair of end plates 22, a pair of side plates 23, an insulation cover 24, and a module cover 25.

In one example, the cell holders 21 are made of a resin material such as polybutylene terephthalate (PBT). Each cell holder 21 intervenes between mutually adjacent battery cells 1 of the plurality of battery cells 1 stacked in the thickness direction (x-axis direction), and holds these battery cells 1 to sandwich them from both sides in the thickness direction (x-axis direction). The module terminals 101P and 101N, which are external terminals of the battery module 100, are disposed at a pair of cell holders 21 that are at both ends of the battery cell group 10 in the stacking direction (x-axis direction) of the plurality of battery cells 1 making up the battery cell group 10. The module terminal 101P is a positive electrode terminal and the module terminal 101N is a negative electrode terminal.

The pair of end plates 22 includes plate members made of metal. The pair of end plates 22 is disposed at both ends of the battery cell group 10 via the pair of cell holders 21 disposed on both sides of the battery cell group 10 in the stacking direction (x-axis direction) of the plurality of battery cells 1 making up the battery cell group 10. Each of the end plates 22 as a pair has one face that is opposed to the plurality of battery cells 1 held at the cell holders 21. The other face of the end plate 22 is directed to the outside that is on the other side of the battery cell group 10, and has a fixing part 22*a*.

The fixing part 22*a* at each of the end plates 22 as a pair is substantially cylindrical, and a part of the cylindrical face protrudes outward from the outer face of the end plate 22. The cylindrical fixing part 22*a* has a bolt hole that is bored along the center axis parallel to the height direction (z-axis direction) of the end plate 22. This fixing part 22*a* of the end plate 22 is to fix the battery module 100 to an external mechanism such as a vehicle or another machine. The lower end face of this fixing part 22*a* of the end plate 22 is a supported face 20*a* of the housing 20 that is supported by the external mechanism as stated above.

That is, to fix the battery module 100 to the external mechanism, the operator may place the supported face 20*a* of the housing 20, which is the bottom face of each fixing part 22*a* of the end plates 22, on the external mechanism for supporting, and insert a bolt into the bolt hole of the fixing part 22*a* and screw the bolt together with an internal thread or a nut of the external mechanism for fastening. In other words, the battery module 100 is fixed to the external mechanism with the bolt, and is supported by the external mechanism at the supported faces 20*a* of the housing 20 that is the lower end faces of the fixing parts 22*a* of the end plates 22.

When the battery module 100 is mounted on a vehicle such as an electric vehicle or a hybrid vehicle, the external mechanism to fix the battery module 100 is the vehicle body of such a vehicle. Although not limited especially, when the vehicle to fix the battery module 100 is placed on a horizontal road surface, the length direction (x-axis direction) and the width direction (y-axis direction) of the housing 20 of the battery module 100 are substantially parallel to the horizontal direction, and the height direction (z-axis direction) of the housing 20 of the battery module 100 is substantially parallel to the vertical direction. In this state, the supported face 20*a* of the housing 20 is substantially parallel to the horizontal plane.

The pair of side plates 23 is disposed on both sides of the plurality of battery cells 1 making up the battery cell group 10 in the width direction (y-axis direction) via the cell holders 21. The side plates 23 as a pair are metal members each having a substantially rectangular shape, and are mutually opposed on both sides of the housing 20 in the width direction (y-axis direction). The side plates 23 as a pair are substantially oblongs, having the long-side direction, i.e., longitudinal direction in the stacking direction (x-axis direction) of the plurality of battery cells 1 making up the battery cell group 10 and the short-side direction, i.e., transverse direction in the height direction (z-axis direction) of the plurality of battery cells 1 making up the battery cell group 10. The pair of side plates 23 are fastened at both ends in the longitudinal direction to the pair of end plates 22 by fasteners such as rivets and bolts. The pair of side plates 23 engage with recess-like grooves of the cell holders 21 at both ends in the transverse direction.

The insulation cover 24 is a plate member made of resin such as PBT having an electrical insulating property. The insulation cover 24 is opposed to the upper end face of each cell case 1*a* having the cell terminals 1*p* and 1*n* of the battery cell 1. The insulation cover 24 has openings to expose the upper end faces of the cell terminals 1*p* and 1*n* of the plurality of battery cells 1 and a partition wall for insulation between the cell terminals 1*p* and 1*n* of the mutually adjacent battery cells 1 and between the mutually adjacent busbars 2. The partition wall of the insulation cover 24 is disposed so as to surround the cell terminals 1*p* and 1*n* of the battery cells 1 and the busbars 2. Various types of electric wiring are placed on the insulation cover 24 to connect to the battery cell group 10 and the electronic circuit board.

The electronic circuit board not shown is disposed between the insulation cover 24 and the module cover 25, i.e., on the insulation cover 24 on the other side of the battery cell group 10 in the height direction of the housing 20, and electrically connects to the busbars 2 via connecting conductors such as leading wiring and printed wiring and to a temperature sensor (thermistor) to detect the temperatures of the battery cells 1.

The busbars 2 are connecting conductors that electrically and mechanically connect the plurality of battery cells 1 of the battery cell group 10 and electrically and mechanically connect the battery cell group 10 with the module terminals 101P and 101N.

The busbars 2 electrically and mechanically connecting the plurality of battery cells 1 of the battery cell group 10 are a plurality of busbars 2A that electrically and mechanically connect the battery cells 1. These busbars 2A are joined by welding to the upper end faces of the cell terminals 1*p* and 1*n* of the plurality of battery cells 1 of the battery cell group 10 that are exposed through the openings of the insulation cover 24. Each busbar 2A electrically connects the cell terminal 1*p* of one of mutually adjacent battery cells 1 in the stacking direction and the cell terminal 1*n* of the other battery cell 1, so as to electrically connect all of the battery cells 1 of the battery cell group 10 in series.

The busbars 2 connecting the battery cell group 10 with the module terminals 101P and 101N are a pair of busbars 2B disposed at both ends of the battery cell group 10 in the stacking direction of the battery cells. One of the busbars 2B as a pair electrically and mechanically connects to the cell terminal 1*p* of one of the pair of battery cells 1 disposed at both ends of the plurality of battery cells 1 in the stacking direction. The other busbar 2B electrically and mechanically connects to the cell terminal 1*n* of the other of the pair of battery cells 1 disposed at both ends of the plurality of battery cells 1 in the stacking direction.

One end of one of the busbars 2B as a pair is joined by welding to the upper end face of the cell terminal 1*p* of one of the battery cells 1, and the other end is fastened to the module terminal 101P disposed at one of the ends of the battery cell group 10 in the stacking direction of the battery cells with a fastener such as a rivet or a bolt. One end of the other of the busbars 2B as a pair is joined by welding to the upper end face of the cell terminal 1*n* of one of the battery cells 1, and the other end is fastened to the module terminal 101N disposed at the other end of the battery cell group 10 in the stacking direction with a fastener such as a rivet or a bolt.

The module cover 25 is a plate member made of resin such as PBT having an electrical insulating property. The module cover 25 is disposed at the upper end of the housing 20 on the other side of the battery cell group 10 in the height direction (z-axis direction) of the housing 20 so as to cover the insulation cover 24 and the electronic circuit board. The module cover 25 has terminal covers 25*a* at the positions corresponding to the module terminals 101P and 101N so as to cover the module terminals 101P and 101N from the above. The module cover 25 is fixed to the upper part of the insulation cover 24 by engaging hooks 24*b* disposed at the frame 24*a* of the insulation cover 24 with the side edge of the module cover 25.

The battery module 100 having the above-stated configuration has the module terminals 101P and 101N that electrically connect to an external electric generator or electric motor via an inverter as a power converter, and so exchanges electricity with such an external electric generator or electric motor via the inverter.

Next the following describes the configuration of the busbars 2 in details.

Figure 3:
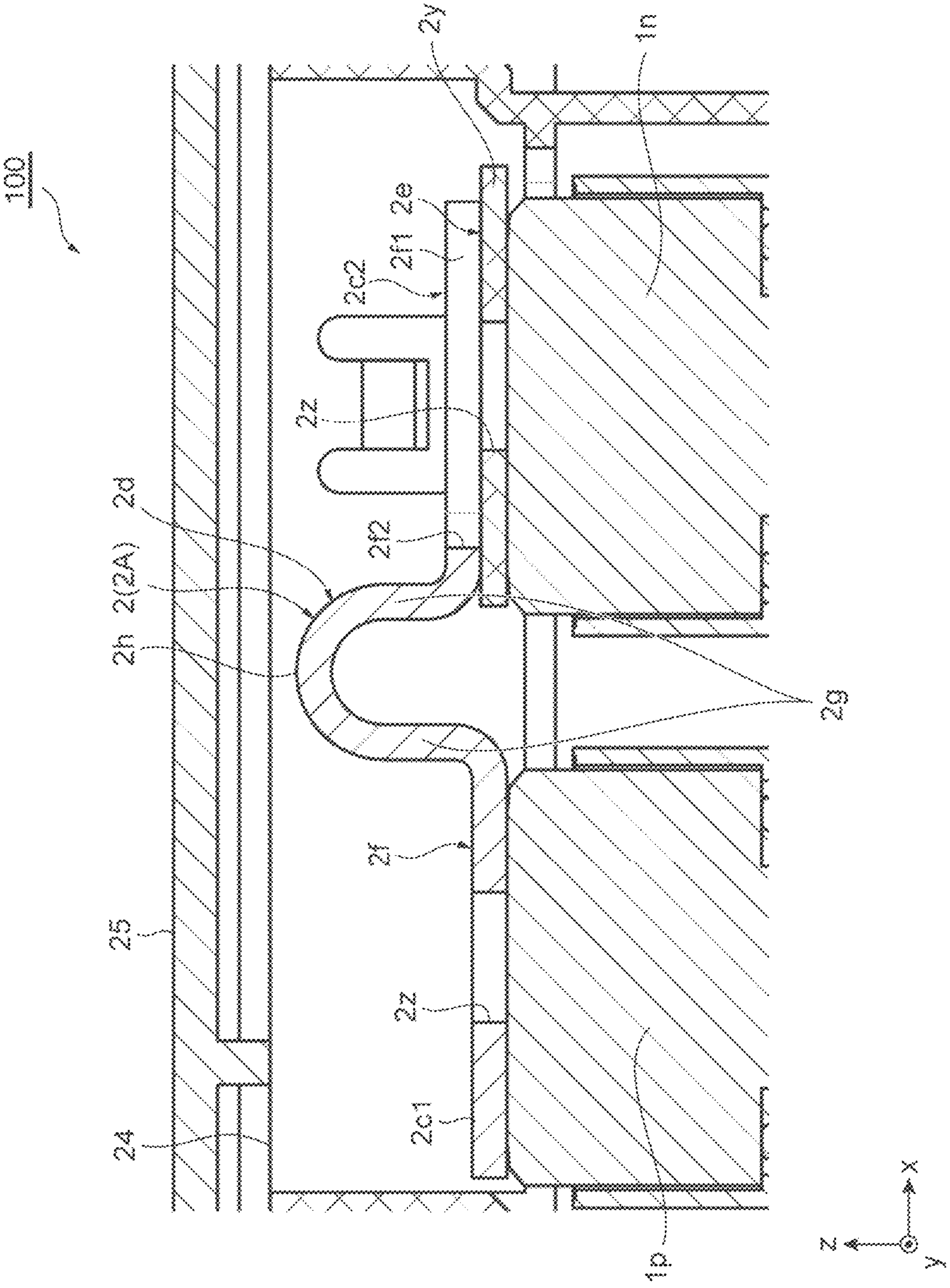
FIG. 3 is an enlarged cross sectional view of the major part of the battery module in FIG. 1.
Figure 4:
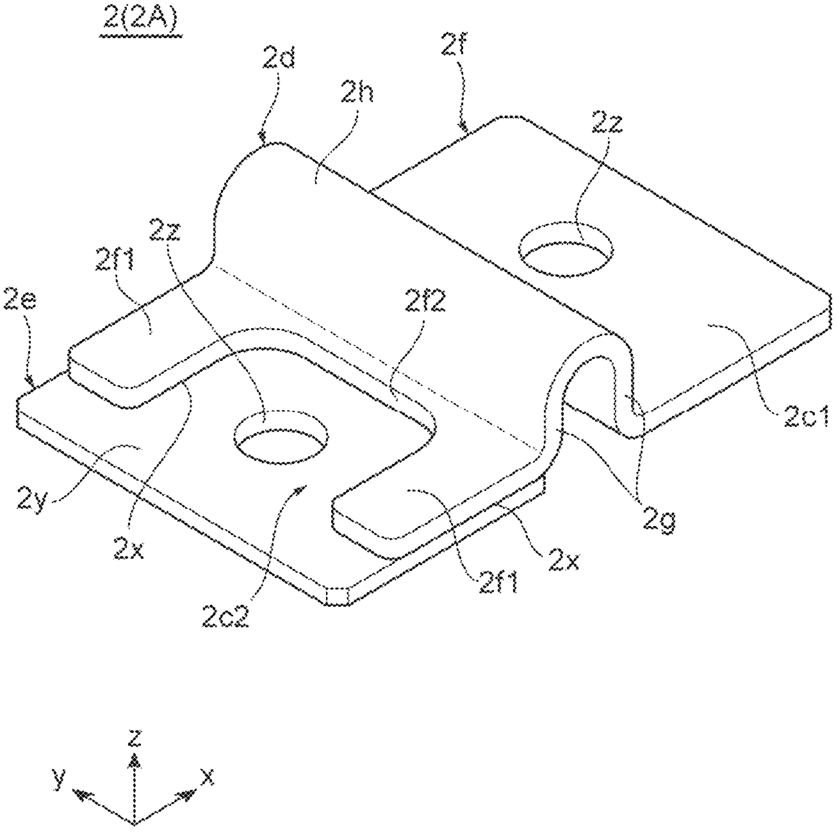
FIG. 4 is a perspective view of the busbar shown in FIG. 3.
Figure 5:
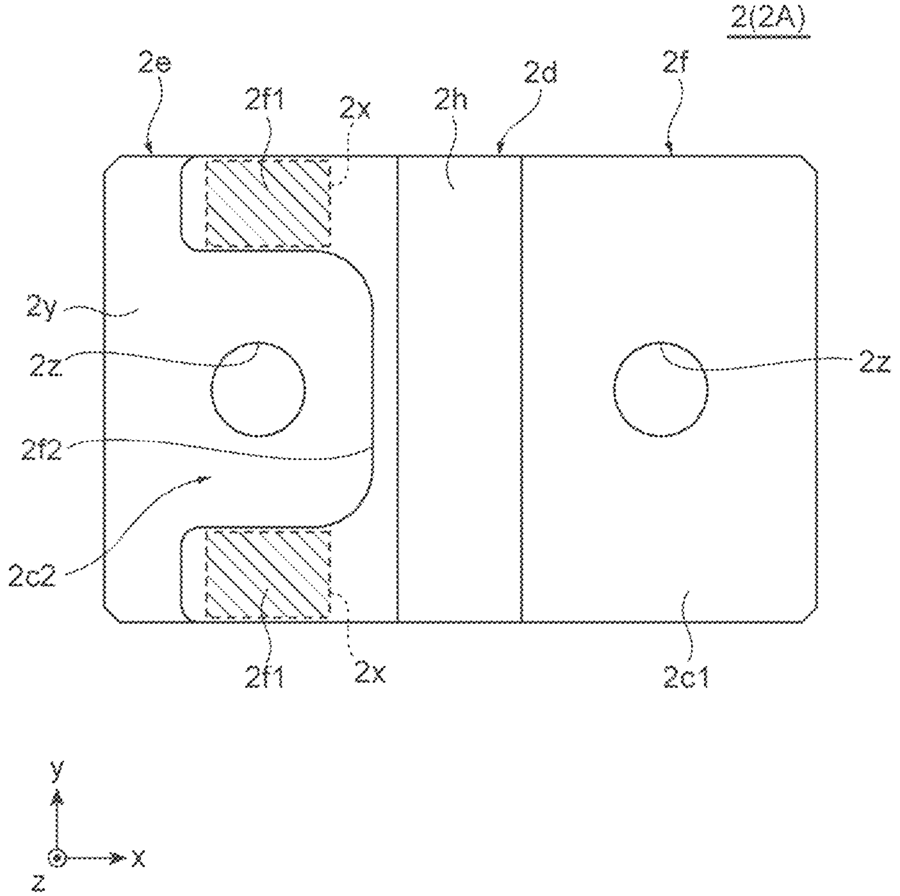
FIG. 5 is a plan view of the busbar shown in FIG. 3.

First, the configuration of the busbars 2A will be described in details referring to FIGS. 3 and 5. FIG. 3 is an enlarged cross-sectional view of the battery module 100, FIG. 4 is a perspective view of the busbar 2A, and FIG. 5 is a plan view of the busbar 2A. As described above, the battery module 100 of the present embodiment has the most distinctive feature in the structure of the busbar 2A.

As shown in FIG. 3, the busbar 2A is a connecting conductor electrically and mechanically connecting the cell terminal 1*p* of one of the adjacent battery cells 1 in the stacking direction of the battery cells and the cell terminal 1*n* of the other battery cell, and is also a dissimilar metal junction structure formed by joining a copper portion 2*e* containing copper and an aluminum portion 2*f* containing aluminum.

The busbar 2A has a pair of connection face portions 2*c*1 and 2*c*2, and a bridge portion 2*d* joining this pair of connection face portions 2*c*1 and 2*c*2.

Of the pair of connection face portions 2*c*1 and 2*c*2, the connection face portion 2*c*1 to be joined to the cell terminal 1*p* is a flat rectangular portion formed only with the aluminum portion 2*f*, and is disposed on the top surface of the cell terminal 1*p* and joined by laser welding. For the laser welding, laser is applied to the surface of the connection face portion 2*c*1 so as to move the laser along a positioning hole 2*z* of the connection face portion 2*c*1 (see FIGS. 4 and 5) with the cell terminal 1*p* and circumferentially around the solid portion outside the positioning hole 2*z* to join the cell terminal 1*p* and the connection face portion 2*c*1.

The connection face portion 2*c*2 to be joined to the negative cell terminal 1*n* is a substantially flat rectangular portion where the copper portion 2*e* and the aluminum portion 2*f* are overlapped in the overlapping direction (z-axis direction) with the cell terminal 1*n*, and the copper portion 2*e* is joined to the cell terminal 1*n* by laser welding. The copper portion 2*e* defines a flat rectangular plate portion, and a pair of arms 2*f*1 projecting parallel to each other from a flat portion 2*g* as a rising portion are overlapped on the flat portion for joining. The connection face portion 2*c*2 is a dissimilar metal joining portion where the pair of arms 2*f*1 including the aluminum portions 2*f* are overlapped for joining on the flat rectangular portion including the copper portion 2*e* (on the opposite side of the cell terminal 1*n*), that is, on the flat portion.

The pair of arms 2*f*1 is formed by cutting out a central portion in the transverse direction (y-axis direction) of the aluminum portion 2*f*, which projects from a bridge portion 2*d* toward the connection face portion 2*c*2, from the projecting end toward the bridge portion 2*d*. The pair of arms 2*f*1 defines a recess 2*f*2, which is a recessed portion of the flat plate and is recessed toward the bridge portion 2*d*, therebetween so as to expose the copper portion 2*e* including the positioning hole 2*z*.

The aluminum portion 2*f* of the connection face portion 2*c*2 is a molded product of a rectangular flat plate that is recessed toward the bridge portion 2*d*. The aluminum portion 2*f* overlaps only on a part of both ends of the rectangular flat copper portion 2*e* in the transverse direction (y-axis direction) and on the end of the rectangular flat copper portion 2*e* close to the bridge portion 2*d* to expose the other portion of the copper portion 2*e*. The copper portion 2*e* of the connection face portion 2*c*2 therefore can be joined to the cell terminal 1*n* by laser welding. For the laser welding, laser is applied to the surface of the copper portion 2*e* at the connection face portion 2*c*2 so as to move the laser along the positioning hole 2*z* of the copper portion 2*e* of the connection face portion 2*c*2 (see FIGS. 4 and 5) with the cell terminal 1*n* and circumferentially around the solid portion outside the positioning hole 2*z* to join the cell terminal 1*n* and the copper portion 2*e* of the connection face portion 2*c*2.

Ultrasonic joining is used for joining the copper portion 2*e* and the aluminum portion 2*f* at the connection face portion 2*c*2, that is, the flat portion of the copper portion 2*e* and the pair of arms 2*f*1 of the aluminum portion 2*f*. In this embodiment, the overlapping portions with the aluminum portions 2*f* at both ends of the rectangular flat copper portion 2*e* in the transverse direction (y-axis direction) are the joints 2*x* by ultrasonic joining. For the ultrasonic joining, a face of the copper portion 2*e* on the opposite side of the aluminum portion 2*f* is placed on an anvil, and a horn is applied to the surface of the aluminum portion 2*f* on the opposite side of the copper portion 2*e* so as to apply ultrasonic vibrations to the overlapping portion of the copper portion 2*e* and the aluminum portion 2*f* for joining of the copper portion 2*e* and the aluminum portion 2*f*. The surface of the copper portion 2*e* or the aluminum portion 2*f* or both surfaces, which are to be ultrasonically joined, may undergo the coating processing such as tin or nickel plating.

In this way, this embodiment includes the joint 2*x* of the copper portion 2*e* and the aluminum portion 2*f* formed at the connection face portion 2*c*2. Such a joint 2*x* of the copper portion 2*e* and the aluminum portion 2*f* formed at the connection face portion 2*c*2 increases the rigidity of the joint 2*x* of the copper portion 2*e* and the aluminum portion 2*f* and so increases the natural frequency, because the cell terminal 1*n* is a strong member. The present embodiment therefore reduces stress acting on the joint 2*x* between the copper portion 2*e* and the aluminum portion 2*f* due to vibrations of the battery module 100 or the like, and so keeps the joint strength high at the joint 2*x* between the copper portion 2*e* and the aluminum portion 2*f*. The present embodiment therefore enhances the resistance of the battery module 100 against vibrations and the like, and provides a reliable battery module 100.

The bridge portion 2*d* is an inverted U-shaped portion formed only with the aluminum portion 2*f*, and has a pair of flat portions 2*g* (they may be called rising portions) rising vertically or at a steep angle upward from the bridge portion 2*d*-side ends of the aluminum portions 2*f* that define the connection face portions 2*c*1 and 2*c*2, and a folded portion 2*h* (they may be called a connection portion) joining between the pair of flat portions 2*g*. The folded portion 2*h* is curved in an arch shape.

The copper portion 2*e* defining the connection face portion 2*c*2 that is exposed from the aluminum portion 2*f* has an end portion of the rectangular flat copper portion 2*e* projecting in the direction opposite to the bridge portion 2*d*. This end portion serves a detection conductor to detect the voltage, and is provided as a voltage detection wire joint 2*y* where lead wiring (not shown) for voltage detection is joined by brazing or ultrasonic welding. The voltage detection wire joint 2*y* may be located at the aluminum portion 2*f* defining the connection face portion 2*c*1.

Figure 17:
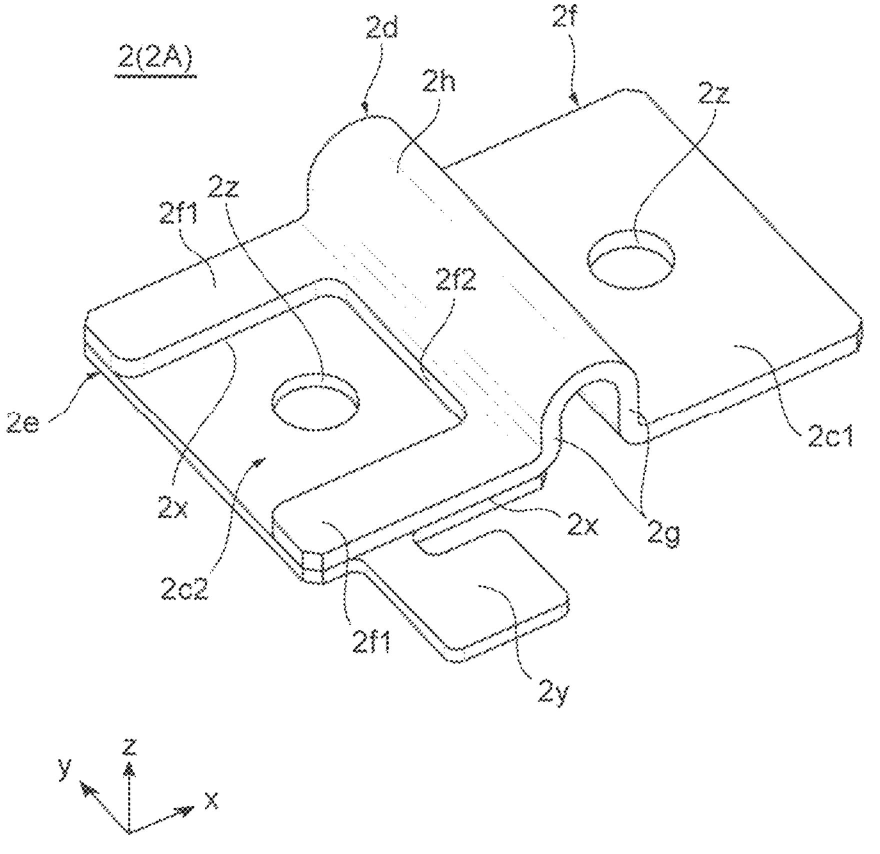
FIG. 17 is a perspective view of a busbar having a voltage detection wire joint disposed at a copper portion of the connection face portion.
Figure 18:
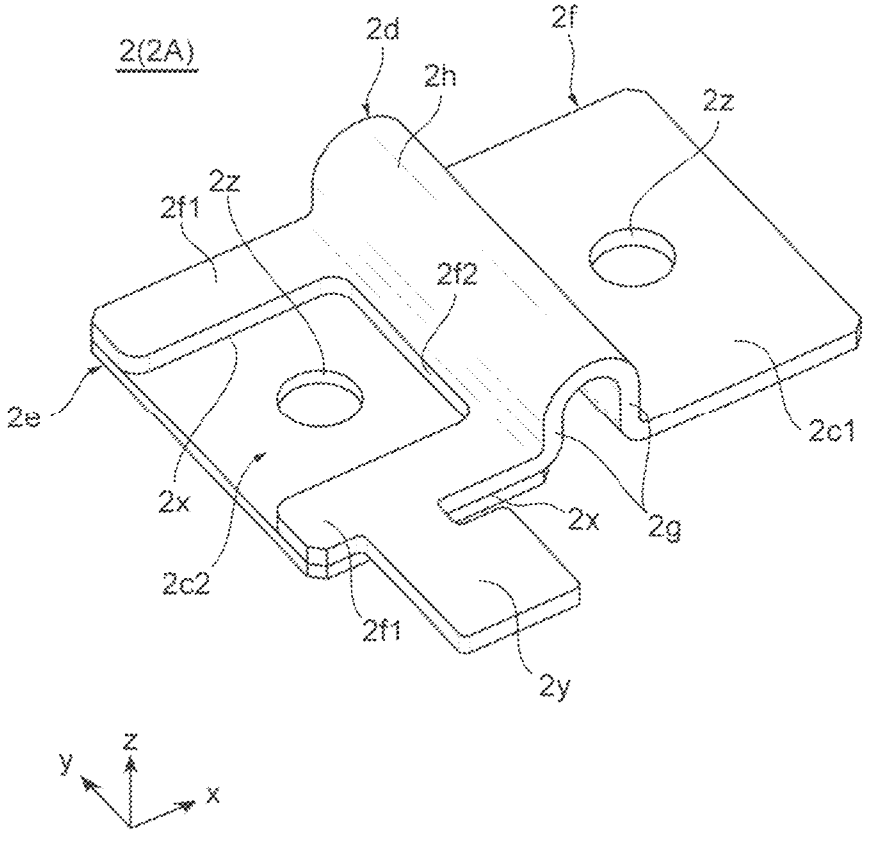
FIG. 18 is a perspective view of a busbar having a voltage detection wire joint disposed at an aluminum portion of the connection face portion.

In another example as shown in FIGS. 17 and 18, a terminal for joining voltage detection wiring may extend out as the voltage detection wire joint 2*y* from the aluminum portion 2*f* defining the connection face portion 2*c*1 or the copper portion 2*e* defining the connection face portion 2*c*2, and lead wiring for voltage detection (not shown) may be joined to this extended terminal by brazing or ultrasonic welding. The extended terminal and the lead wiring may be connected with a terminal including an elastic member for connecting them under pressure.

Figure 6:
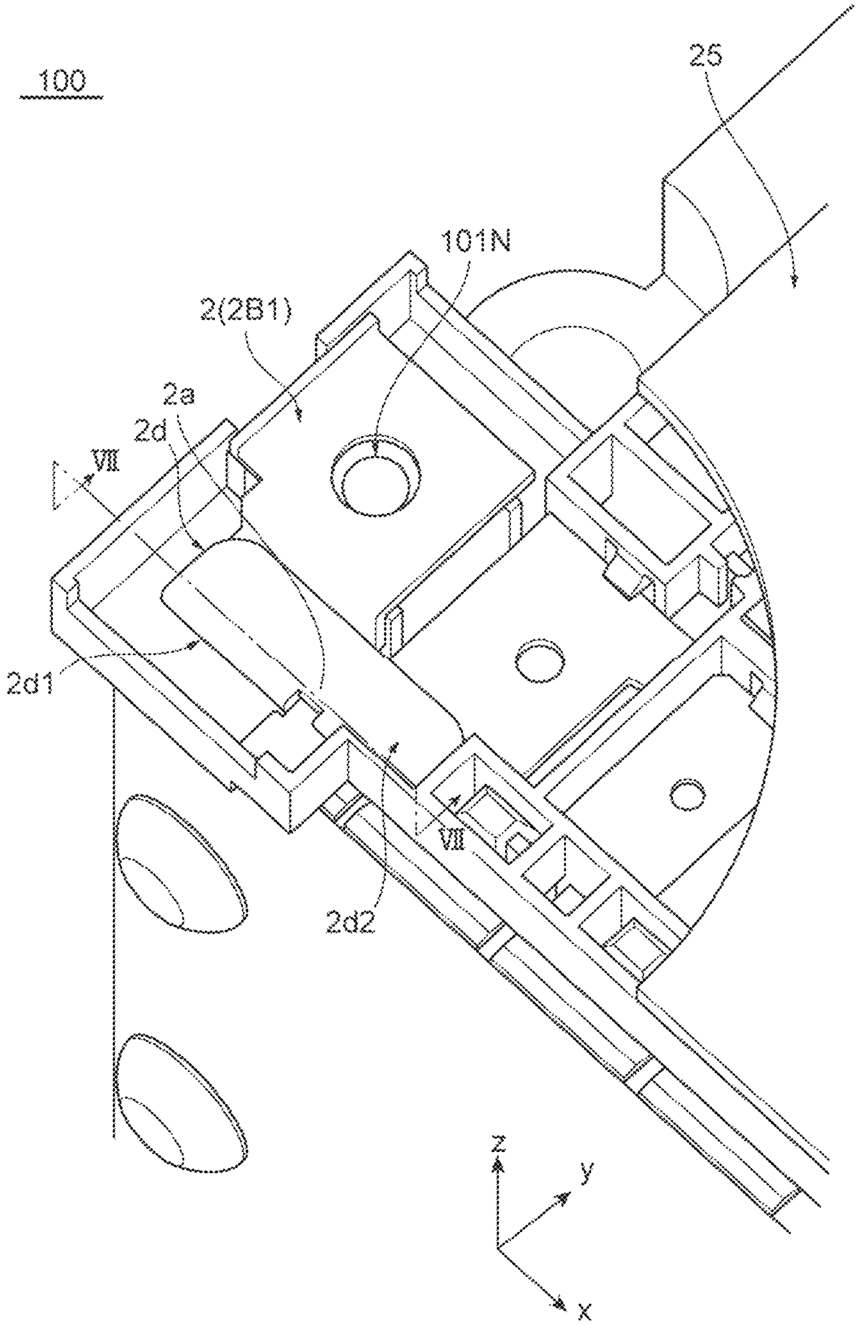
FIG. 6 is an enlarged perspective view of a module terminal of the battery module in FIG. 1.
Figure 7:
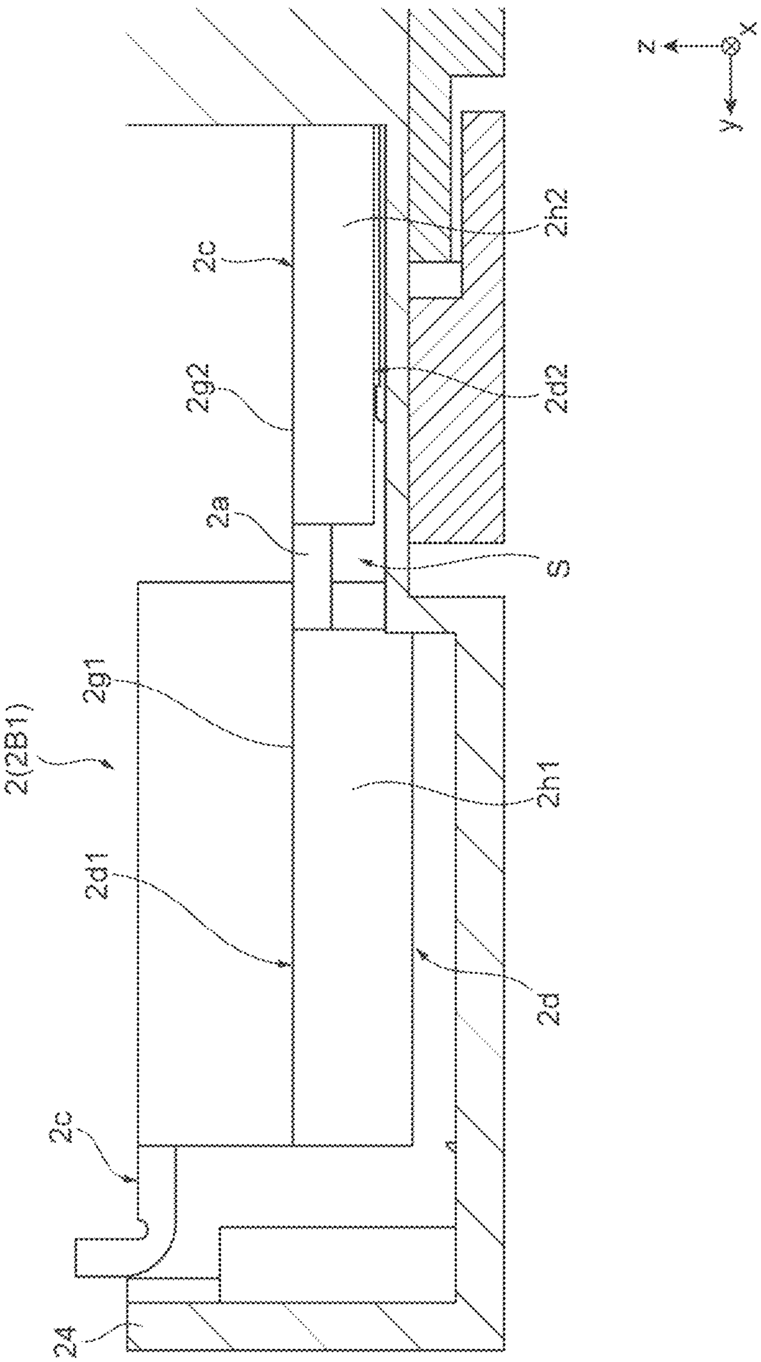
FIG. 7 is an enlarged cross sectional view of the module terminal taken along the line VII-VII of FIG. 6.
Figure 8:
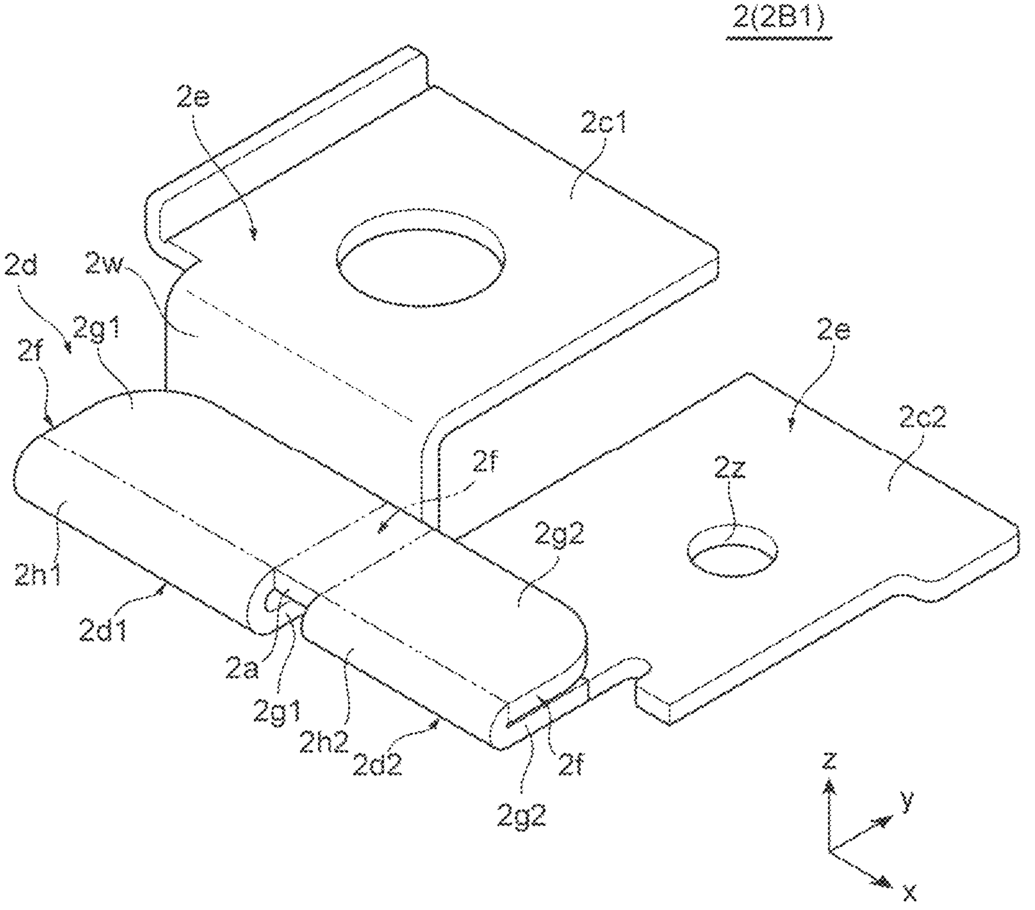
FIG. 8 is a perspective view of a busbar having a fuse that is connected to one of the module terminals that is shown in FIG. 6.
Figure 9:
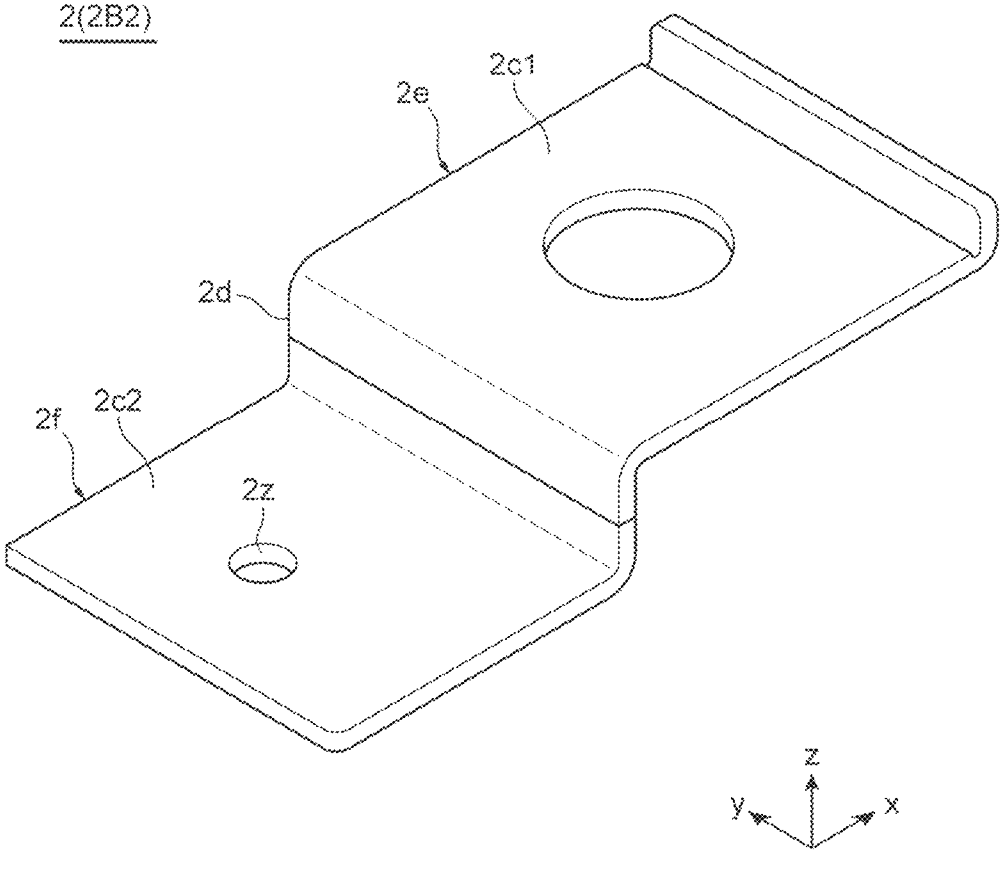
FIG. 9 is a perspective view of a busbar that is connected to the other module terminal different from the module terminal shown in FIG. 6.

Next, the configuration of the busbars 2B will be described in detail referring to FIGS. 6 to 9. FIG. 6 is an enlarged perspective view of the battery module 100 in FIG. 1. FIG. 7 is an enlarged cross-sectional view taken along the line VII-VII of FIG. 6. FIG. 8 is a perspective view of the busbar 2B connected to the module terminal 101N in FIG. 6, and FIG. 9 is a perspective view of the busbar 2B connected to the module terminal 101P. FIG. 6 is a cutaway view of a terminal cover, which is a part of the module cover 25. This embodiment has a feature in that the busbar 2B connected to the module terminal 101N includes a fuse 2*a*, which is the smallest portion in volume in the current path, and has a space S below the fuse 2*a* of the busbar 2B for dropping the melted fuse 2*a*. The term "below" refers to vertically below when the battery module 100 is placed so that the supported face 20*a* of the housing 20 is horizontal. The fuse 2*a* may be disposed in the busbar 2B connected to the module terminal 101P.

First, the configuration of the busbar 2B1 connected to the module terminal 101N is described in details with reference to FIGS. 6 to 8.

The busbar 2B1 has a pair of connection face portions 2*c*1 and 2*c*2 that are placed side by side in the x-axis direction, and a bridge portion 2*d* extending from these connection face portions in the y-axis direction so as to join this pair of connection face portions 2*c*1 and 2*c*2 outside of these connection face portions.

The connection face portions 2*c*1 and 2*c*2 are rectangular flat plates. The connection face portion 2*c*1 to be connected to the module terminal 101N and the connection face portion 2*c*2 to be connected to the cell terminal 1*n* are different in height in the z-axis direction. In the present embodiment, the connection face portion 2*c*1 is located higher than the connection face portion 2*c*2. The height of the connection face portion 2*c*1 and the connection face portion 2*c*2 may be the same, or their relationship in height may be reversed.

The bridge portion 2*d* is a bent portion in the direction (y-axis direction) to intersect the connection face portions 2*c*1 and 2*c*2. More particularly, the bridge portion 2*d* includes a U-shaped first bridge portion 2*d*1, a U-shaped second bridge portion 2*d*2 placed lateral of the first bridge portion 2*d*1 in the x-axis direction, and the fuse 2*a* connecting between the two bridge portions in the x-axis direction. The first bridge portion 2*d*1 and the second bridge portion 2*d*2 are the same in height in the height direction (z-axis direction) of the battery cells 1.

The first bridge portion 2*d*1 includes a pair of flat portions 2*g*1 horizontally placed in the z-axis direction and a folded portion 2*h*1 (this may be called a connection portion) joining the pair of flat portions 2*g*1. The folded portion 2*h*1 is curved in an arch shape. The flat portion 2*g*1 connected to the connection face portion 2*c*1 and the flat portion 2*g*1 connected to the fuse 2*a* face each other in the Z-axis direction, and they are connected by the folded portion 2*h*1 at their ends on the opposite side of the connection face portion 2*c*1. The bridge 2*d*-side end of the connection face portion 2*c*1 and the connection surface portion 2*c*1-side end of the lower flat portion 2*g*1 in the z-axis direction of the pair of flat portions 2*g*1 are connected by a flat bridge 2*w* (this may be called a rising portion) extending (rising) in the z-axis direction.

The second bridge portion 2*d*2 includes a pair of flat portions 2*g*2 horizontally placed in the z-axis direction and a folded portion 2*h*2 (this may be called a connection portion) joining the pair of flat portions 2*g*2. The folded portion 2*h*2 is curved in an arch shape. The flat portion 2*g*2 connected to the connection face portion 2*c*2 and the flat portion 2*g*2 connected to the fuse 2*a* face each other in the z-axis direction, and they are connected by the folded portion 2*h*2 at their ends on the opposite side of the connection face portion 2*c*2. Of the pair of flat portions 2*g*2, the lower flat portion 2*g*2 in the z-axis direction has a connection face portion 2*c*2-side end connected to the bridge portion 2*d*-side end of the connection face portion 2*c*2 in such a manner that the connection face portion 2*c*2-side end extends horizontally in the y-axis direction toward the connection face portion 2*c*2.

The fuse 2*a*-side end of the upper flat portion 2*g*1 in the z-axis direction of the pair of flat portions 2*g*1 and the fuse 2*a*-side end of the upper flat portion 2*g*2 in the z-axis direction of the pair of flat portions 2*g*2 are connected by the fuse 2*a*. The current path between the first bridge portion 2*d*1 and the second bridge portion 2*d*2 includes only the fuse 2*a*, which has a smaller current carrying area than those of the first bridge portion 2*d*1 and the second bridge portion 2*d*2, and is the smallest volume current path in the busbar 2B1. With this configuration, when an excessive current flows through the busbar 2B1, the current density and temperature due to heat generation in the fuse 2*a* will be the highest in the busbar 2B1. When the temperature due to the heat generation exceeds the melting point temperature of the material of the fuse 2*a*, the fuse 2*a* blows the fastest in the busbar 2B1. This allows the current path of busbar 2B1 to be interrupted.

The busbar 2B1 is a dissimilar metal joint structure formed by joining the copper portion 2*e* containing copper and the aluminum portion 2*f* containing aluminum. Clad joining is used to join these dissimilar metals, and so the busbar 2B1 may be referred to as a clad busbar. In this embodiment, the connection face portions 2*c*1 and 2*c*2 and the bridge portion 2*w* are the copper portions 2*e*, and the bridge portion 2*d* is the aluminum portion 2*f*. A part of the bridge portion 2*d* (e.g., the upper flat portion 2*g*1 in the z-axis direction of the pair of flat portions 2*g*1, the upper flat portion 2*g*2 in the z-axis direction of the pair of flat portions 2*g*2, and the fuse 2*a*) may be the aluminum portions 2*f*, and the remaining may be the copper portions 2*e*.

This embodiment includes the folded parts 2*h* due to the space in the insulation cover 24 to store the busbar. In another embodiment having a larger space to store the busbar, the folded parts 2*h* may be omitted.

When the battery module is designed so that the module terminal 101N and the cell terminal 1*n* are at the same height, the bridge portion 2*w* also can be omitted.

The space S to allow the melted fuse 2*a* to fall is defined by the battery cell 1 and the housing 20. Specifically the space S below the fuse 2*a* is an internal space of the housing 20 defined by the cell terminal 1*p* or 1*n* and the cell case 1*a* of the battery cell 1 and the cell holder 21 of the housing 20. The space S faces the lower face of the busbar 2B1 opposed to the battery cell 1. The space S has a depth that is equal to or longer than the height of the cell terminal 1*n* in the direction (z-axis direction) perpendicular to the supported face 20*a* of the housing 20 and has a sufficiently large volume compared to the volume of the fuse 2*a*. If excessive current flows through the busbar 2B1 and the metal of the fuse 2*a* melts, the melted metal material of the fuse 2*a* falls down into the space S below the fuse 2*a* due to the action of gravity. This prevents the melted metal material from forming a new current path between the positive cell terminal 1*p* and the negative cell terminal 1*n* of the battery cell 1, thereby improving the safety of the battery module 100.

With the configuration of the busbar 2B1 of this embodiment, the fuse 2*a* can be located farther from the cell terminal 1*n*. This prevents a melted metal material from forming a new current path between the positive cell terminal 1*p* and the negative cell terminal 1*n* of the battery cell 1 more reliably, and so further improves the safety of the battery module 100.

Next, the configuration of the busbar 2B2 connected to the module terminal 101P will be described in detail referring to FIG. 9.

The busbar 2B2 has a pair of connection face portions 2*c*1 and 2*c*2 that are placed side by side in the x-axis direction, and a bridge portion 2*d* joining this pair of connection face portions 2*c*1 and 2*c*2.

The connection face portions 2*c*1 and 2*c*2 are rectangular flat plates. The connection face portion 2*c*1 to be connected to the module terminal 101P and the connection face portion 2*c*2 to be connected to the cell terminal 1*p* are different in height in the z-axis direction. In the present embodiment, the connection face portion 2*c*1 is located higher than the connection face portion 2*c*2. The height of the connection face portion 2*c*1 and the connection face portion 2*c*2 may be the same, or their relationship in height may be reversed.

The bridge portion 2*d* is a flat rectangular portion that is bent (rising) in the direction (z-axis direction) that intersects the connection face portions 2*c*1 and 2*c*2, and may be called a rising portion.

The busbar 2B2 is a dissimilar metal joint structure formed by joining a copper portion 2*e* containing copper and an aluminum portion 2*f* containing aluminum. Clad joining is used to join these dissimilar metals, and so the busbar 2B2 may be referred to as a clad busbar. In this embodiment, a part from the connection face portion 2*c*1 to a part of the bridge portion 2*d* is the copper portion 2*e*, and a part from the connection face portion 2*c*2 to the part of the bridge portion 2*d* is the aluminum portion 2*f*.

Embodiment 2

Figure 10:
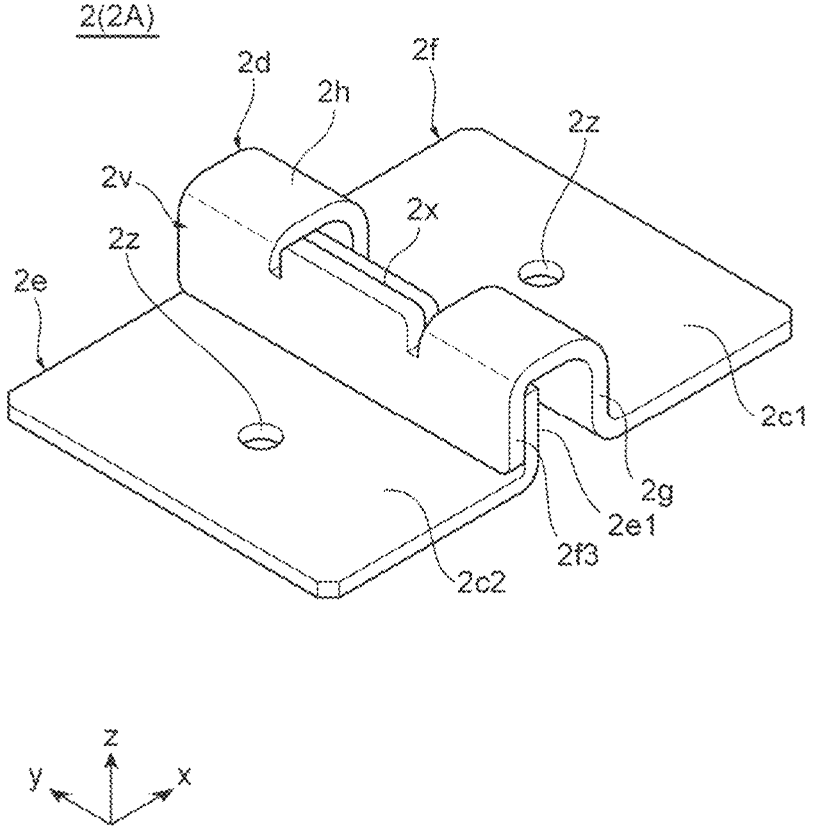
FIG. 10 is a perspective view of a busbar connecting battery cells of a battery module according to Embodiment 2 of the present invention.
Figure 11:
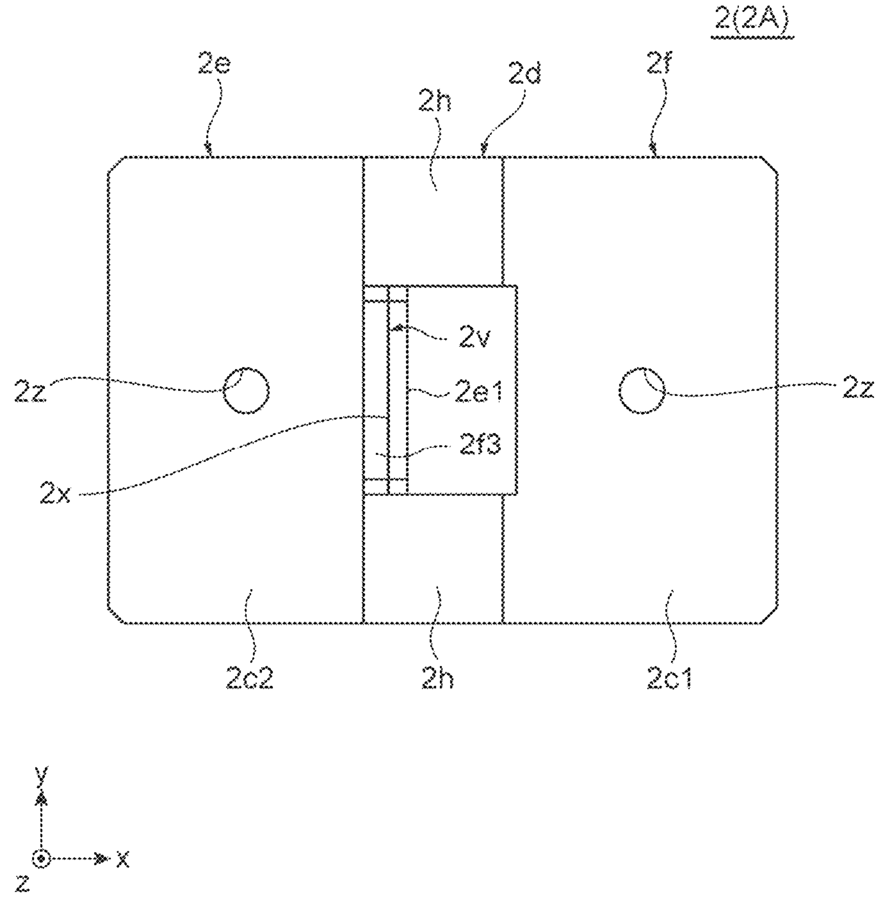
FIG. 11 is a plan view of the busbar shown in FIG. 10.
Figure 12:
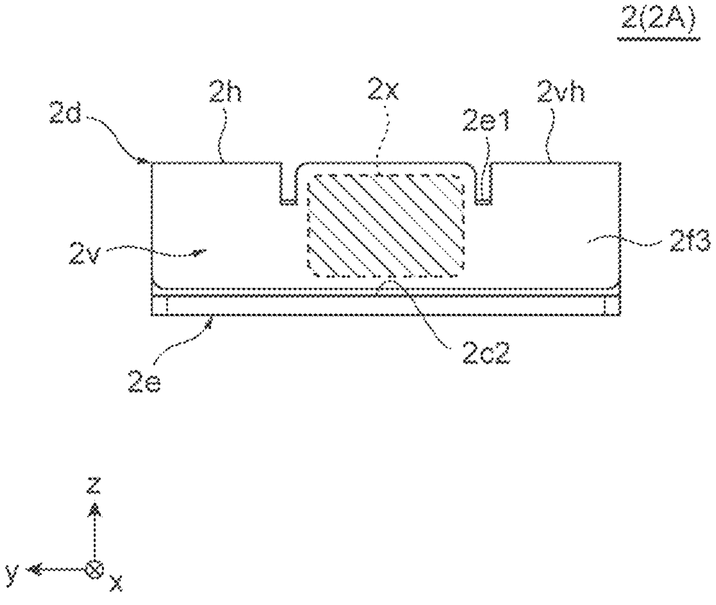
FIG. 12 is a side view of the busbar shown in FIG. 10.

FIGS. 10 to 12 show Embodiment 2 of the present invention.

Similarly to Embodiment 1, this embodiment is for keeping a joint strength high at the joint 2*x* between the copper portion 2*e* and the aluminum portion 2*f* of the busbar 2A, and its structure is different from that of Embodiment 1. FIG. 10 is a perspective view of the busbar 2A. FIG. 11 is a plan view of the busbar 2A, and FIG. 12 is a side view of the busbar 2A. The configuration of the battery module is the same as that of Embodiment 1 except for the busbar 2A, and the following describes differences from Embodiment 1 only.

The busbar 2A is a connecting conductor electrically and mechanically connecting the cell terminal 1*p* of one of the adjacent battery cells 1 in the stacking direction of the battery cells and the cell terminal 1*n* of the other battery cell, and is also a dissimilar metal junction structure formed by joining a copper portion 2*e* containing copper and an aluminum portion 2*f* containing aluminum.

As shown in FIG. 10, the busbar 2A has a pair of connection face portions 2*c*1 and 2*c*2, and a bridge portion 2*d* joining this pair of connection face portions 2*c*1 and 2*c*2.

Of the pair of connection face portions 2*c*1 and 2*c*2, the connection face portion 2*c*1 to be joined to the cell terminal 1*p* is a flat rectangular portion formed only with the aluminum portion 2*f*, and is disposed on the top surface of the cell terminal 1*p* and joined by laser welding. For the laser welding, laser is applied to the surface of the connection face portion 2*c*1 so as to move the laser along the positioning hole 2*z* of the connection face portion 2*c*1 (see FIGS. 10 and 11) with the cell terminal 1*p* and circumferentially around the solid portion outside the positioning hole 2*z* to join the cell terminal 1*p* and the connection face portion 2*c*1.

The connection face portion 2*c*2 to be joined to the negative cell terminal 1*n* is a flat rectangular portion formed with the copper portion 2*e* only, and is disposed on the top surface of the cell terminal 1*n* and joined by laser welding. For the laser welding, laser is applied to the surface of the connection face portion 2*c*2 so as to move the laser along the positioning hole 2*z* of the connection face portion 2*c*2 (see FIGS. 10 and 11) with the cell terminal 1*n* and circumferentially around the solid portion outside the positioning hole 2*z* to join the cell terminal 1*n* and the connection face portion 2*c*2.

The bridge portion 2*d* is an inverted U-shaped portion formed with the copper portion 2*e* and the aluminum portion 2*f*, and has a flat portion 2*g* (this may be called a rising portion) rising vertically or at a steep angle upward from the bridge portion 2*d* side-end of the aluminum portion 2*f* that defines the connection face portions 2*c*1, a flat portion 2*v* opposed to the flat portion 2*g* in the x-axis direction, and a folded portion 2*h* (this may be called a connection portion) joining between the flat portions 2*g* and 2*v*.

The folded portion 2*h* is curved in an arch shape. The flat portion 2*g* and the folded portion 2*h* include the aluminum portions 2*f*, and the flat portion 2*v* includes the joining of the copper portion 2*e* and the aluminum portion 2*f*. The flat portion 2*v* is a dissimilar metal joining portion where the copper portion 2*e* and the aluminum portion 2*f* are overlapped for joining. The flat portion 2*v* in this embodiment corresponds to one of the rising portions described in the claims, and the flat portion 2*g* corresponds to the other rising portion described in the claims.

The flat portion 2*g* has a shape having a cutout at the center of a rectangular flat plate in the y-axis direction, and includes two portions at both ends in the y-axis direction that extend upwardly in the z-axis direction from the bridge portion 2*d*-side end of the connection face portion 2*c*1. Similarly, the folded portion 2*h* has a cutout at the center in the y-axis direction, and has both ends in the y-axis direction that extend toward the flat portion 2*v*. This exposes the inside of the bridge portion 2*d*, especially the inside of the central portion in the y-axis direction. In other words, the flat portion 2*g* and the folded portion 2*h* have the cutouts that expose a flat rectangular portion 2*e*1.

The flat portion 2*v* is an overlapping portion of the flat rectangular portion 2*e*1 (first flat rectangular portion) rising vertically or at a steep angle upward from the bridge portion 2*d* side-end of the copper portion 2*e* of the connection face portion 2*c*2 and a flat rectangular portion 2*f*3 (second flat rectangular portion) extending downward in the z-axis direction from the folded portion 2*h*, where these flat rectangular portions are overlapped at their inner faces in the x-axis direction. In other words, this is the overlapping portion of the inner faces of the two members that are bent in a hook shape. The flat rectangular portion 2*f*3 is continuous to the folded portion 2*h*, and the side face opposed to the flat portion 2*g* is overlapped and joined to the connection face portion 2*c*2-side side face of the flat rectangular portion 2*e*1.

In this embodiment, the flat rectangular portion 2*f*3 extends over the upper end of the rising flat rectangular portion 2*e*1 and falls down there, so that they overlap in the x-axis direction. The busbar may have this configuration at the flat portion 2*g*. In this case, the flat rectangular portion of the copper portion 2*e* extends over the upper end of the flat rectangular portion of the aluminum portion 2*f* that rises upward from the aluminum portion, and falls down there, so that they overlap in the x-axis direction.

Similarly to Embodiment 1, the copper portion 2*e* and the aluminum portion 2*f* are joined by ultrasonic joining. In this embodiment, the joint 2*x* between the copper portion 2*e* and the aluminum portion 2*f* is located at the center part in the y-axis direction of the overlapping portion between the flat rectangular portion 2*e*1 and the flat rectangular portion 2*f*3. For the ultrasonic joining, an anvil is applied to one of the surfaces of the flat rectangular portion 2*e*1 on the opposite side of the flat rectangular portion 2*f*3 and the flat rectangular portion 2*f*3 on the opposite side of the flat rectangular portion 2*e*1 and at the center part in the y-axis direction, and a horn is applied to the surface of the other so as to apply ultrasonic vibrations to the overlapping portion of the flat rectangular portion 2*e*1 and the flat rectangular portion 2*f*3 for joining of the copper portion 2*e* and the aluminum portion 2*f*. The surface of the copper portion 2*e* or the aluminum portion 2*f* or both surfaces, which are to be ultrasonically joined, may undergo the coating processing such as tin or nickel plating.

In this way, this embodiment includes the joint 2*x* of the copper portion 2*e* and the aluminum portion 2*f* formed at the bridge portion 2*d*. At the bridge portion 2*d*, the flat rectangular portion 2*e*1 and the flat rectangular portion 2*f*3 are bent into a hook shape and are boned at their opposed inner surfaces. If stress acts on the busbar in the direction of tearing off the copper portion 2*e* and the aluminum portion 2*f*, this joining structure receives a pressurizing force to bring these portions into contact, and the elastic force at their bending portions acts on the joint 2*x* of the copper portion 2*e* and the aluminum portion 2*f* as the reaction force in the direction opposite to the direction of the stress acting on the joint 2*x* of the copper portion 2*e* and the aluminum portion 2*f*. As a result, the stress acting on the joint 2*x* between the copper portion 2*e* and the aluminum portion 2*f* is reduced.

This means that if stress acts in the direction of separating the connection face portions 2*c*1 and 2*c*2 in the x-axis direction, a force will act on the busbar in a direction to bring the flat rectangular portion 2*e*1 of the copper portion 2*e* and the flat rectangular portion 2*f*3 of the aluminum portion 2*f* into contact under pressure. This embodiment therefore keeps a joint strength high at the joint 2*x* of the copper portion 2*e* and the aluminum portion 2*f*. Similarly to Embodiment 1, the present embodiment therefore improves the resistance of the battery module against vibrations and the like, and provides a reliable battery module.

A voltage detection wire joint may be disposed at either surface of the connection face portions 2*c*1 and 2*c*2. A terminal for connecting voltage detection wiring may extend out from either the connection face portion 2*c*1 or 2*c*2, and lead wiring for voltage detection (not shown) may be joined to this extended terminal by brazing or ultrasonic welding. The extended terminal and the lead wiring may be connected with a terminal including an elastic member for connecting them under pressure.

Embodiment 3

FIGS. 13 to 16 show Embodiment 3 of the present invention.

Figure 13:
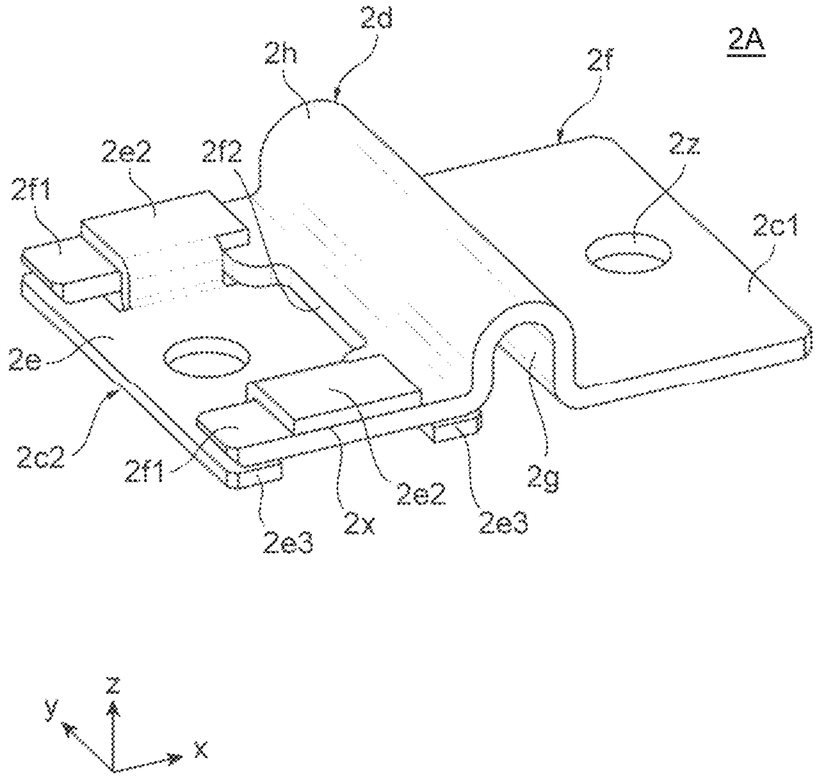
FIG. 13 is a perspective view of a busbar connecting battery cells of a battery module according to Embodiment 3 of the present invention.
Figure 14:
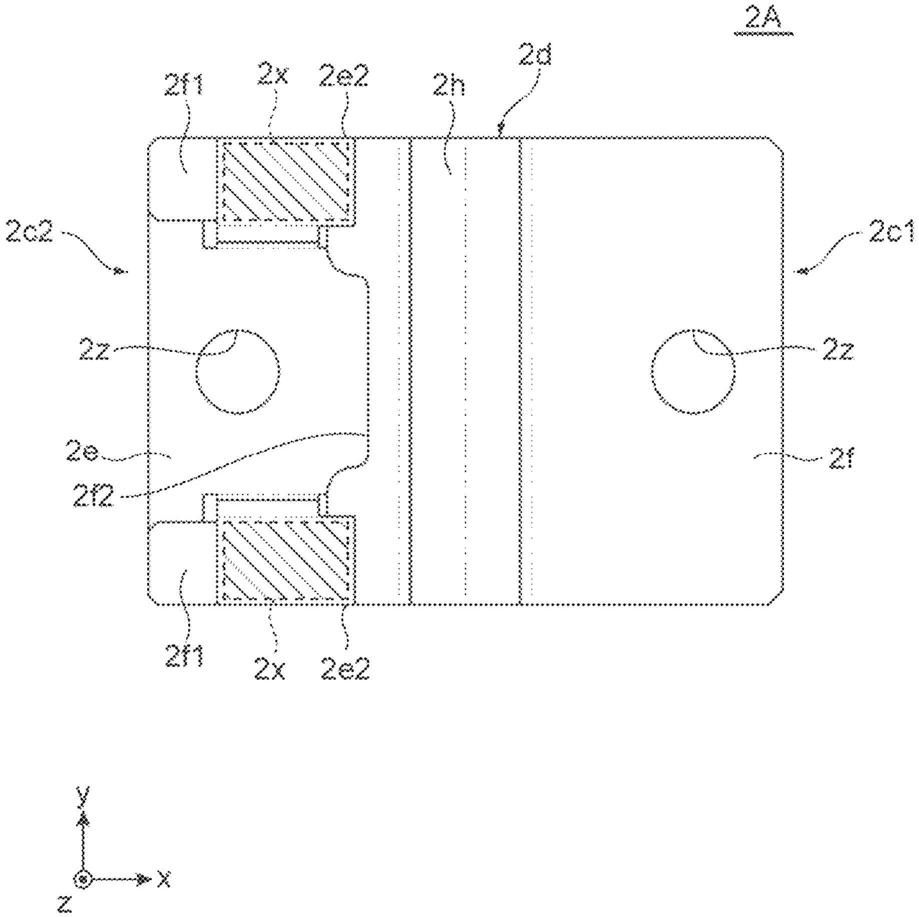
FIG. 14 is a plan view of the busbar shown in FIG. 13.
Figure 15:
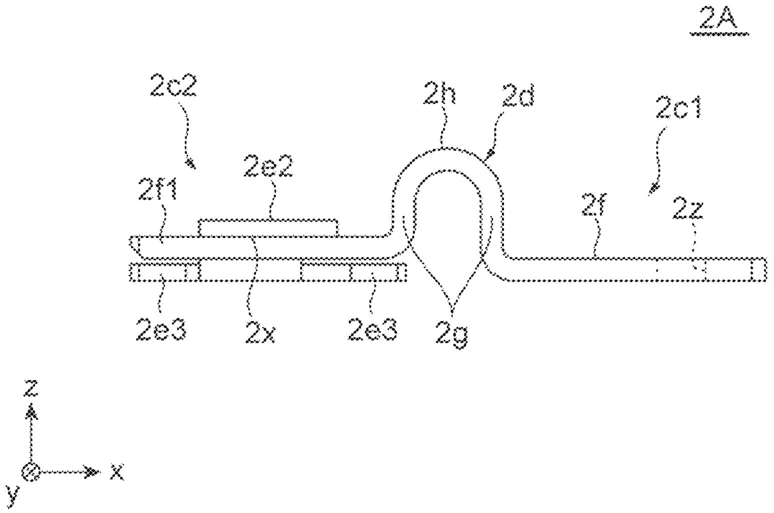
FIG. 15 is a side view of the busbar shown in FIG. 13.
Figure 16:
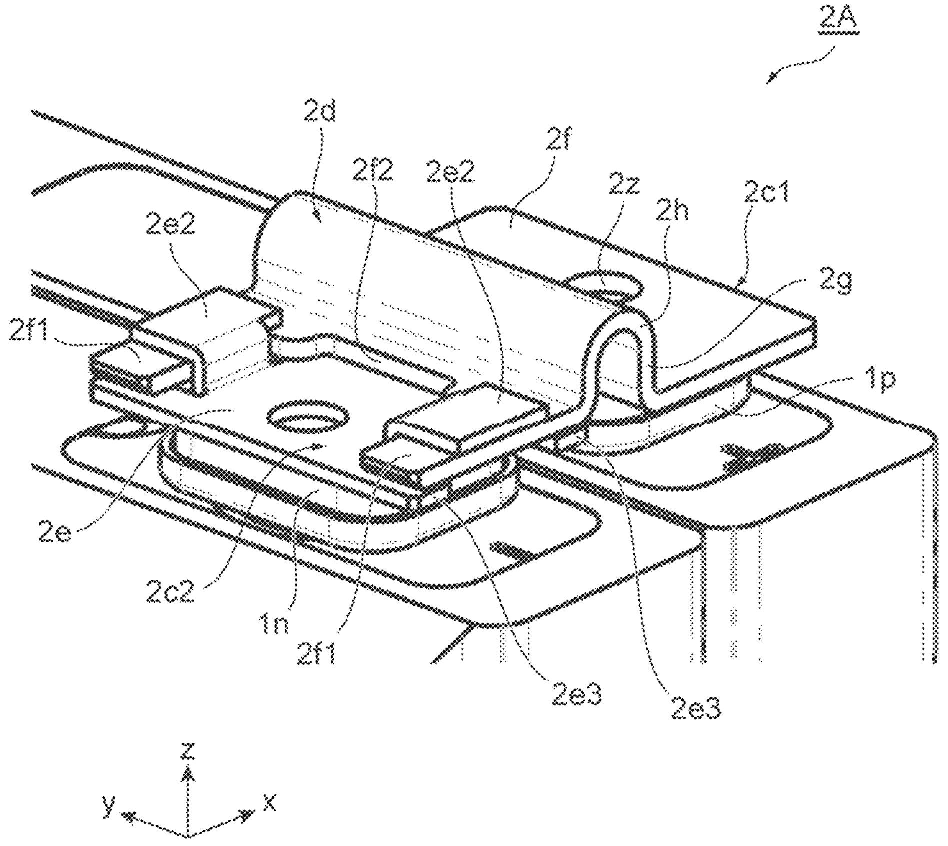
FIG. 16 is a perspective view of a busbar placed on cell terminals.

Similarly to Embodiment 1, this embodiment is for keeping a joint strength high at the joint 2*x* between the copper portion 2*e* and the aluminum portion 2*f* of the busbar 2A, and its structure is different from that of Embodiment 1. FIG. 13 is a perspective view of the busbar 2A, FIG. 14 is a plan view of the busbar 2A, FIG. 15 is a side view of the busbar 2A, and FIG. 16 is a perspective view of the busbar 2A placed on cell terminals. The configuration of the battery module is the same as that of Embodiment 1 except for the busbar 2A, and the following describes differences from Embodiment 1 only.

As shown in FIG. 16, the busbar 2A is a connecting conductor electrically and mechanically connecting the cell terminal 1*p* of one of the adjacent battery cells 1 in the stacking direction of the battery cells and the cell terminal 1*n* of the other battery cell, and is also a dissimilar metal junction structure formed by joining a copper portion 2*e* containing copper and an aluminum portion 2*f* containing aluminum.

As shown in FIG. 13, the busbar 2A has a pair of connection face portions 2*c*1 and 2*c*2, and a bridge portion 2*d* joining this pair of connection face portions 2*c*1 and 2*c*2.

Of the pair of connection face portions 2*c*1 and 2*c*2, the connection face portion 2*c*1 to be joined to the cell terminal 1*p* is a flat rectangular portion formed only with the aluminum portion 2*f*, and is disposed on the top surface of the cell terminal 1*p* and joined by laser welding. For the laser welding, laser is applied to the surface of the connection face portion 2*c*1 so as to move the laser along the positioning hole 2*z* of the connection face portion 2*c*1 (see FIGS. 13 and 14) with the cell terminal 1*p* and circumferentially around the solid portion outside the positioning hole 2*z* to join the cell terminal 1*p* and the connection face portion 2*c*1.

The connection face portion 2*c*2 to be joined to the negative cell terminal 1*n* is a substantially flat rectangular portion having a U-shaped part at each of the both ends in the longitudinal direction (x-axis direction) of the copper portion 2*e* so that the aluminum portion 2*f* is caught in the U-shaped parts of the copper portion 2*e* and is overlapped in the overlapping direction (z-axis direction) with the cell terminal 1*n*, and the copper portion 2*e* is joined to the cell terminal 1*n* by laser welding. In other words, the connection face portion 2*c*2 is a dissimilar metal joining portion where the flat recessed part of the aluminum portion 2*f* that is recessed toward the bridge portion 2*d* is overlapped on the flat rectangular portion of the copper portion 2*e* (on the opposite side of the cell terminal 1*n*).

The aluminum portion 2*f* at the connection face portion 2*c*2 has a pair of arms 2*f*1. The pair of arms 2*f*1 is formed by cutting out a central portion of the aluminum portion 2*f* in the transverse direction (y-axis direction), which projects from a bridge portion 2*d* toward the connection face portion 2*c*2, from the projecting end toward the bridge portion 2*d*. The pair of arms 2*f*1 defines a recess 2*f*2, which is a recessed portion of the flat plate that is recessed toward the bridge portion 2*d*, therebetween so as to expose the copper portion 2*e* including the positioning hole 2*z*.

The copper portion 2*e* of the connection face portion 2*c*2 has bases 2*e*3 and claws 2*e*2 facing each of the pair of arms 2*f*1 from one side and the other side of the overlapping direction. The bases 2*e*3 of the copper portion 2*e* are spaced apart from each other in the transverse direction and at both ends in the longitudinal direction to form pairs. The claws 2*e*2 of the copper portion 2*e* are formed by raising center parts in the transverse direction at both ends in the longitudinal direction to separate them from the cell terminal 1*n* located on one side in the overlapping direction relative to the bases 2*e*3, so that the arms 2*f*1 are insertable into gaps between the claws 2*e*2 and the bases 2*e*3.

The aluminum portion 2*f* of the connection face portion 2*c*2 is a molded product of a rectangular flat plate that is recessed toward the bridge portion 2*d*. The aluminum portion 2*f* overlaps only on a part of both ends of the rectangular flat copper portion 2*e* in the transverse direction (y-axis direction) and on the end of the rectangular flat copper portion 2*e* close to the bridge portion 2*d* to expose the other portion of the copper portion 2*e*. The copper portion 2*e* of the connection face portion 2*c*2 therefore can be joined to the cell terminal 1*n* by laser welding. For the laser welding, laser is applied to the surface of the copper portion 2*e* at the connection face portion 2*c*2 so as to move the laser along the positioning hole 2*z* of the copper portion 2*e* of the connection face portion 2*c*2 (see FIGS. 13 and 14) with the cell terminal 1*n* and circumferentially around the solid portion outside the positioning hole 2*z* to join the cell terminal 1*n* and the copper portion 2*e* of the connection face portion 2*c*2.

The copper portion 2*e* and the aluminum portion 2*f* (the pair of arms 2*f*1) at the connection face portion 2*c*2 are joined by ultrasonic joining. In this embodiment, the overlapping portions with the aluminum portions 2*f* at the U-shaped flat portions located at both ends of the rectangular flat copper portion 2*e* in the transverse direction (y-axis direction), i.e., the overlapping portions of the arms 2*f*1 of the aluminum portion 2*f* with the claws 2*e*2 of the copper portion 2*e* are the joints 2*x* by ultrasonic joining. For the ultrasonic joining, the face of the copper portion 2*e* opposed to the aluminum portion 2*f* is placed on an anvil, and a horn is applied to the surface of the aluminum portion 2*f* on the opposite side of the copper portion 2*e* so as to apply ultrasonic vibrations to the overlapping portion of the copper portion 2*e* and the aluminum portion 2*f* for joining of the copper portion 2*e* and the aluminum portion 2*f*. The surface of the copper portion 2*e* or the aluminum portion 2*f* or both surfaces, which are to be ultrasonically joined, may undergo the coating processing such as tin or nickel plating.

In this way, this embodiment includes the copper portion 2*e*, a part of which has a U-shaped portion that sandwiches the aluminum portion 2*e*2 from above and below for overlapping, so as to form the joint 2*x* between the arms 2*f*1 and the claws 2*e*2. The copper portion 2*e* is joined by laser to the cell terminal 1*n*, which is also made of copper, and they can be joined strongly because it is a copper-to-copper join. If external pressure is applied to the aluminum portion 2*f* in the upward direction, the joint becomes stronger, and if external pressure is applied to the aluminum portion 2*f* in the downward direction, the joint 2*x* does not bend downward because the cell terminal 1*n* under the aluminum portion 2*f* provides support. This embodiment therefore keeps a joint strength high at the joint 2*x* of the copper portion 2*e* and the aluminum portion 2*f*. Similarly to Embodiment 1, the present embodiment therefore improves the resistance of the battery module against vibrations and the like, and provides a reliable battery module.

That is a detailed description of the embodiments of the present disclosure. The present disclosure is not limited to the above-stated embodiments, and the design may be modified variously without departing from the spirits of the present disclosure. For instance, the entire detailed configuration of the embodiments described above for explanatory convenience is not always necessary for the present invention. A part of one embodiment may be replaced with the configuration of another embodiment, or the configuration of one embodiment may be added to the configuration of another embodiment. A part of the configuration of each embodiment may include another configuration that is added, or may be deleted or replaced with another configuration.

REFERENCE SIGNS LIST

1 Battery cell
1*p* Cell terminal
1*n* Cell terminal
2 Busbar
2A Busbar
2B1(2B) Busbar
2B2(2B) Busbar
2*a* Fuse
2*c*1 Connection face portion
2*c*2 Connection face portion
2*d* Bridge portion
2*d*1 First bridge portion
2*d*2 Second bridge portion
2*e* Copper portion
2*f* Aluminum portion
2*g* Flat portion
2*h* Folded portion
2*v* Flat portion
2*w* Bridge portion
2*x* Joint
2*y* Voltage detection wire joint
2*z* Positioning hole
10 Battery cell group
100 Battery module
20 Housing
20*a* Supported face
101P Module terminal
101N Module terminal
S Space

The invention claimed is:

1. A battery module comprising:
a plurality of battery cells each having terminals; and
busbars each joining the terminals of the battery cells, each of the busbars including:
a first member including either copper or aluminum; and
a second member including the other of either copper or aluminum of the first member and bonded to the first member,
the first member including:
a first connection face portion connected to a first terminal of the terminals; and
a first rising portion rising from the first connection face portion,
the second member including:
a second connection face portion connected to a second terminal of the terminals;
a second rising portion rising from the second connection face portion;
a falling portion continuous from the second rising portion, over an upper end of the first rising portion and falling down relative to a face of the first rising portion; and
a connection portion connecting the face of the first rising portion of the first member on a side of the first connection face portion and a face of the falling portion of the second member on a side of the second connection face portion,
wherein either of the first rising portion and the falling portion includes copper and the other includes aluminum, and
the connection portion has a dissimilar metal joint where the aluminum and the copper are overlapped and joined.

2. The battery module according to claim 1, wherein the second member is provided with a cutout to expose the first rising portion.

3. The battery module according to claim 2, wherein the cutout is formed at a center portion of the second member in a width direction.

4. The battery module according to claim 3, wherein the cutout is provided over an area between a lower end of the second rising portion and an upper end of the falling portion.

5. The battery module according to claim 1, wherein the connection portion is tin-plated or nickel-plated.

6. The battery module according to claim 1, wherein the connection portion is ultrasonically joined.

* * * * *